J. T. LISTER.
APPARATUS FOR FORMING RUBBERIZED FABRIC TUBES OR STRIPS.
APPLICATION FILED MAY 7, 1914.
1,147,254.
Patented July 20, 1915.
4 SHEETS—SHEET 1.
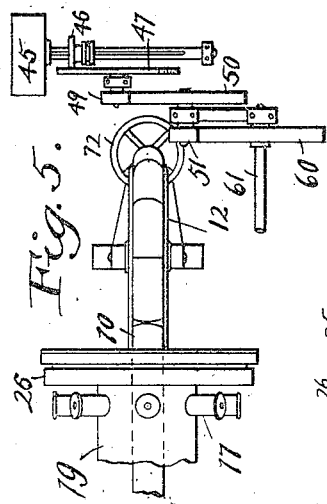
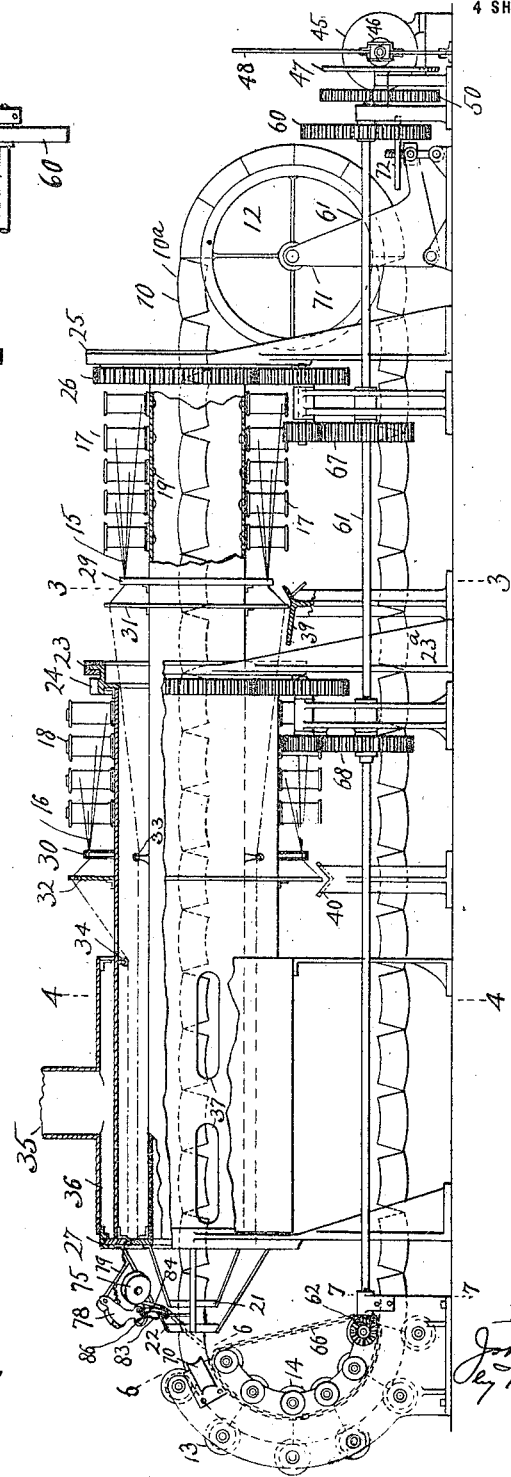

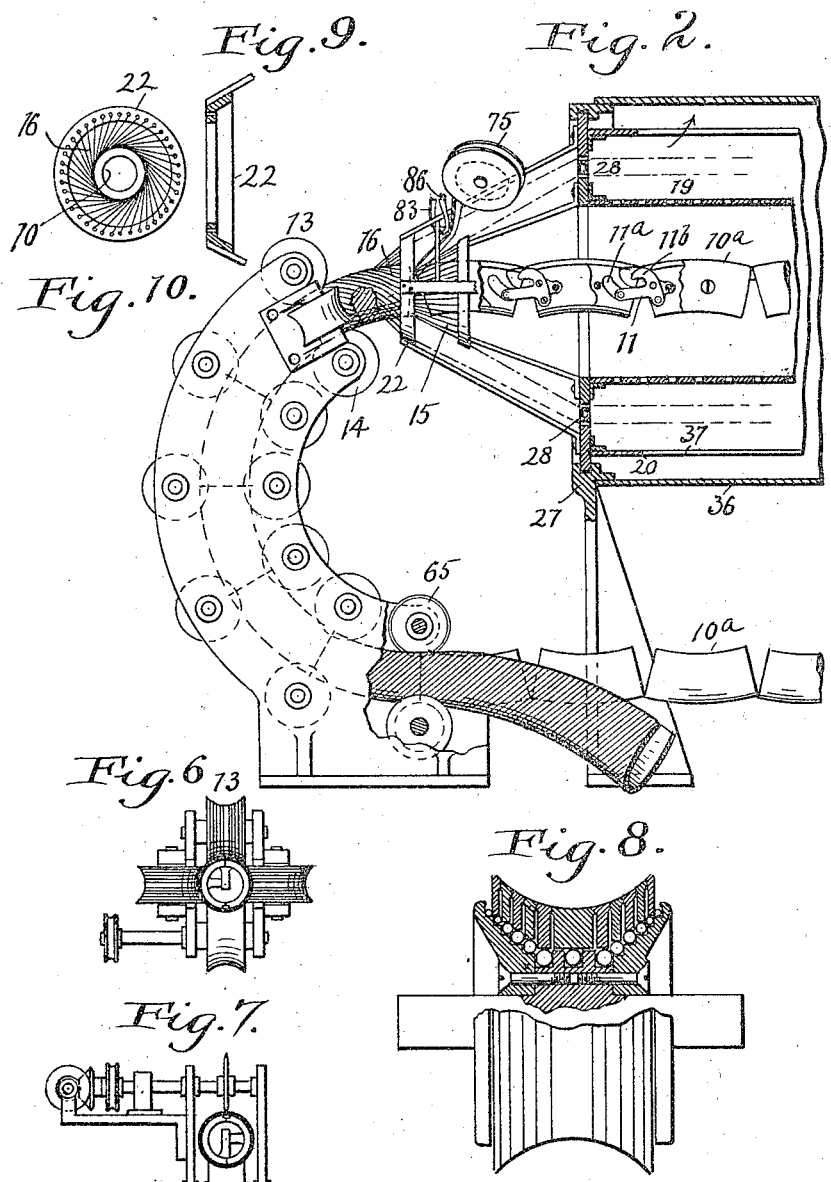

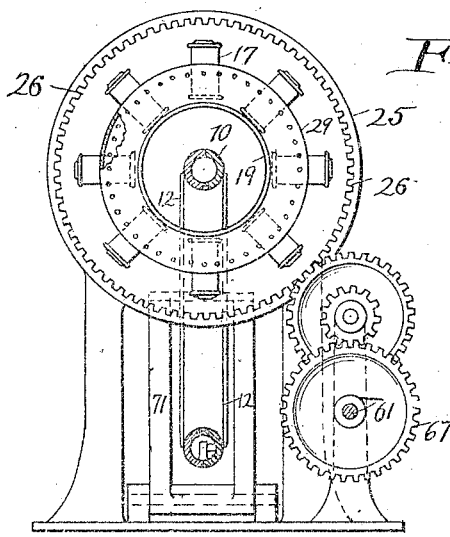
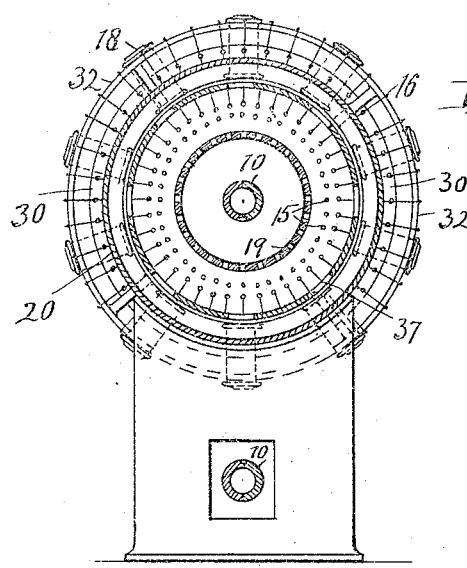

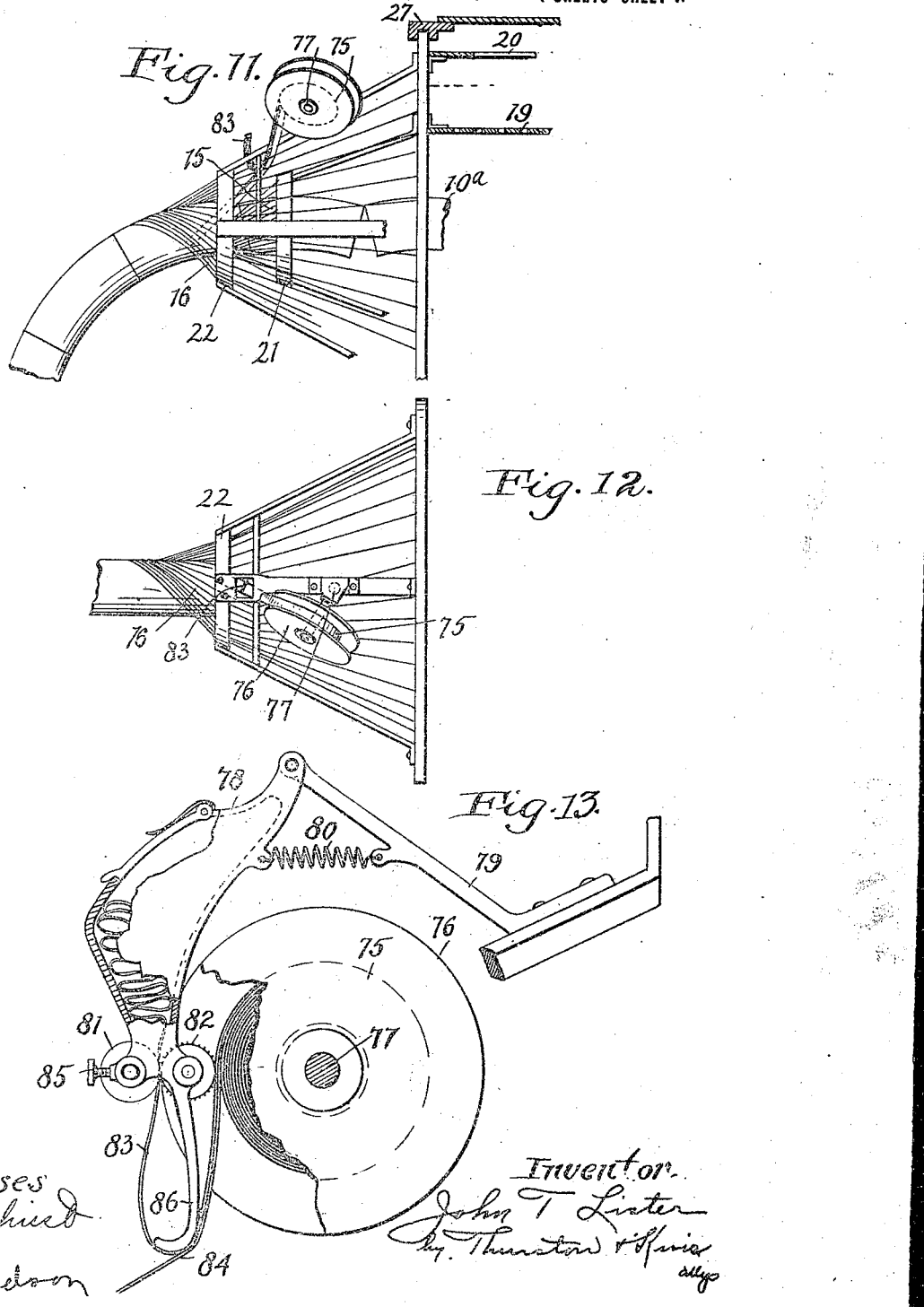

UNITED STATES PATENT OFFICE.

JOHN T. LISTER, OF CLEVELAND, OHIO.

APPARATUS FOR FORMING RUBBERIZED-FABRIC TUBES OR STRIPS.

1,147,254.

Specification of Letters Patent.

Patented July 20, 1915.

Application filed May 7, 1914. Serial No. 836,911.

*To all whom it may concern:*

Be it known that I, JOHN T. LISTER, a citizen of the United States, residing at Cleveland, in the county of Cuyahoga and State of Ohio, have invented a certain new and useful Improvement in Apparatus for Forming Rubberized-Fabric Tubes or Strips, of which the following is a full, clear, and exact description.

This invention relates to apparatus for forming rubberized fabric tubes or strips from tire forming material such as rubberized threads or cords, and is of particular utility in forming hose or tire forming strips.

The apparatus is adapted to carry out the process which forms the subject matter of my companion application Serial No. 752,580, filed March 7th, 1913, and this application constitutes a division of my prior companion application as far as the major portion of the machine or apparatus herein disclosed is concerned.

The apparatus is particularly adapted for winding about a movable core in different directions a plurality of groups of rubberized threads or cords, the groups of threads being wound in such manner as to form superimposed layers, each of closely associated spirally arranged threads or cords, the threads or cords of each layer being arranged at a decided angle with respect to the threads or cords of the adjacent layers. In addition to this, I provide for the introduction of a strip of unvulcanized or raw rubber between adjacent layers of cords, which unites the adjacent layers efficiently and securely.

In utilizing my invention for forming tire strips for which the invention has particular utility, the movable core at and adjacent the points where the groups of threads are wound thereon in opposite directions is substantially of the shape and size of a tire forming core upon which the strips may subsequently be wound, and in carrying out my process of forming these tire forming strips, the strips after being initially formed into annular shape are cut or divided on the inner side so that the said strips can be readily applied to a tire forming core, and formed into commercial tires or tire casings.

In the drawings, I have shown one form of apparatus which may be utilized in carrying out my invention in one of its aspects, or for one of the specific uses to which my invention may be applied, *i. e.*, for the formation of tire forming strips, or strips which may be utilized in the construction of ordinary automobile tires.

In the figures of the drawing, Figure 1 is a side elevation of one form of apparatus which may be utilized for the purpose stated, parts being in section, and other parts being broken away; Fig. 2 is an enlarged sectional side elevation of the forward portion of the apparatus or of that portion at which the tire strips are formed; the cords on the ring of winders being omitted for the sake of clearness; Fig. 3 is a sectional view substantially along the line 3—3 of Fig. 1, the parts being shown on a slightly enlarged scale; Fig. 4 is an enlarged sectional view substantially along the line 4—4 of Fig. 1; Fig. 5 is a plan view of the rear part of the apparatus, showing particularly the motor and gearing utilized in driving the parts of the apparatus; Fig. 6 is a sectional view substantially along the line 6—6 of Fig. 1, looking in the direction indicated by the arrow; Fig. 7 is a sectional view substantially along the line 7—7 looking in the direction indicated by the arrow; Fig. 8 is a detail sectional view of one of the compression rollers; Figs. 9 and 10 are sectional and side views, respectively, on an enlarged scale of one of the cord winders which guide and wind the cords onto the moving core; Fig. 11 is a side elevation of the forward part of the machine showing the rubber strip feed roll; Fig. 12 is a top plan view of the showing in Fig. 11; Fig. 13 is an elevation showing the rubber strip feeding roll, and devices associated therewith, for receiving the cloth strip upon which the rubber strip is mounted.

Referring now to the drawings, it will be seen that the apparatus includes a core 10 which in this case consists of a series of core sections 10ª linked together in the form of an endless chain. Each of these core sections is circular in cross section, and lengthwise considered is arc-shaped or in the shape of a section of annular member or core of a tire forming machine upon which the strips formed with my apparatus are adapted to be subsequently wound in the actual manufacture or construction of the commercial tires, or of the outer casings of the tires of the inner tube type.

Each core section 10ª is preferably composed of two half sections fastened together, (see Figs. 3 and 4) and the different sections are linked together in the manner shown in Fig. 2, wherein it will be seen that each section has secured on the interior thereof, and at one end, a member 11 with a projecting arm carrying a roller which engages in a slot 11ª in a webbing at the end of the next adjacent core section. The member 11 also has a projecting portion 11ᵇ, which extends outwardly toward the outer parts of the two adjacent sections of the core, so as to assist in holding the sections in alinement, when the sections pass about the supporting structure at the forward part of the apparatus, where the strips are formed.

At the rear end of the apparatus, the chain of core sections 10ª passes about a wheel or pulley 12, and at the forward part of the apparatus, the chain of core sections passes between an outer series of rollers 13, and an inner series of rollers 14,—the axes of the two series of rollers being arranged in arcs of concentric circles having diameters such that as the core sections pass between the rollers 13 and 14, they are in the form of a substantially half circle corresponding in size to that of half of a tire forming core upon which the strips may be formed into tires. As the core sections pass between the rollers 13, and 14, the ends of the core sections abut against each other, so as to form a substantially semi-annular core, and when they are so arranged, the projecting members 11ᵇ within the core sections come into play to assist in holding the core sections against relative lateral movement.

In the drawings, I have shown an apparatus for forming the tire strips of two layers or from two oppositely wound groups of cords which extend down onto the core from two annular winders to be referred to, in coaxial conical envelops which surround the core at the strip forming end of the apparatus and are arranged one in advance of the other so as to result in the two layers. The two groups of threads may be designated 15 and 16, the former forming the inner layer and the latter the outer layer. The arrangement is perhaps most clearly disclosed in Fig. 2.

For an understanding of the manner in which I propose to feed the groups of cores to the rotating winders, and the manner in which the cords are rubberized, and thence dried before passing to the winders, reference is had particularly to Fig. 1. By referring to this figure, it will be seen that the groups of threads are fed to the winders from two series of spools 17 and 18, which are mounted on pins or studs projecting radially outward from two hollow concentric rotary cylinders 19 and 20, the inner one of which projects rearwardly beyond the outer cylinder and the inner cylinder constituting the support for the spools which supply the cords 15 which form the inner layer, and the outer cylinder constituting the support for the spools which supply the cords 16 for the outer layer. These two cylinders, together with the spools are designed to be simultaneously rotated in opposite directions. At the forward end of the apparatus are the two rotary annular winders 21 and 22, which are supported from the two cylinders so as to rotate therewith, and hence will rotate in opposite directions. It may be noted at this point that the upper leg of the chain 10 of core sections 10ª passes through the two cylinders and through the winders 21 and 22, which are located at the point where the core sections arrange themselves in the form of a half circle, as previously described. It will be observed that the rear end of the outer cylinder 20 is rotatably supported by an annular support 23 which is supported from beneath by a bracket 23ª and contains an annular groove which receives a radially projecting flange extending outwardly from a driving gear 24 which is secured to the cylinder 20. In a like manner, the inner cylinder is supported by an annular supporting member or housing 25 which will receive the flange projecting from the driving gear 26, a detail of the construction not being shown, as the construction is the same as that at the rear end of cylinder 20.

By reference to Fig. 2, it will be seen that the forward end of the outer cylinder is supported by an annular supporting member or housing 27, having a groove which receives a radially projecting portion of a flange secured to the outer cylinder. The forward end of the inner cylinder is supported from the outer cylinder through the medium of ball bearings 28.

The cords are rubberized or coated with rubber cement after they leave the spools by being passed through rubber cement containing chambers 29 and 30, the former of which is secured to the inner drum 19 just forward of the spools 17 and the latter of which is secured to the drum 20 just forward of the spools 18. The threads after passing through openings in the walls of the cement chambers 29 and 30, pass through notches or openings at the periphery of annular guides 31 and 32, one just forward of the cement chamber 29 and the other just forward of the cement chamber 30, and thence the cords extend forwardly in the annular space between the inner and outer cylinders, over suitable guide rollers 33 and 34, the threads extending in the form of two substantially cylindrical envelops. At the forward end of the cylinders, the cords pass outwardly from the annular space referred to, the inner group of cords passing through openings in a radial flange secured to the end of the inner cylinder, and the outer group of threads passing through openings in a radial flange at the end of the outer cylinder. Thence the cords pass diagonally downward and inward through openings in the rotary annular winders 21 and 22, and thence are wound in opposite directions spirally onto the core.

In passing forwardly from the guide rollers 33 and 34 to the forward ends of the cylinders, the rubberized threads are dried,— the annular space between the cylinders constituting a drying chamber. The rubberized cords are dried by a forced circulation of air drawn through the annular space between the two drums, by means of a suction pipe 35 connected to a drum 36 which is supported in fixed position about the two cylinders, between the rotary winders 21 and 22 at the forward end of the cylinders, and the cement baths or chambers through which the cords pass.

The air which is drawn through the pipe 35 from the drum 36 is drawn through the annular space between the two concentric cylinders. The inner cylinder has suitable perforations 38 which admit the air to the annular space between the cylinders, and the outer cylinder has openings 37 through which the air is drawn from said annular space into the surrounding drum, and thence out through the pipe 35.

Beneath the guides 31 and 32, just in advance of the rubber bath are two drip troughs 39 and 40, which catch the excess rubber cement which is retained on the guides 31 and 32, as the cords pass over the same. These drip troughs may have suitable outlet openings or outlet pipes, as shown.

I shall now describe the manner in which the core sections and the other parts of the apparatus are driven to produce the tire strips. A driving motor 45 has secured to its shaft a friction disk 46 which by frictional engagement drives a friction wheel 47. To vary the speed of the apparatus, the wheel 46 is shifted along the face of the driven wheel 47 by a suitable lever 48. The shaft on which the driven friction wheel 47 is secured, is provided with a pinion 49 which engages a gear 50, and the shaft upon which the gear 50 is secured, is provided with a pinion 51 which engages a gear 60 secured to a long forwardly projecting shaft 61 from which all parts of the apparatus are driven. This shaft 61 is provided at its forward end with a bevel gear 62, which meshes with a bevel gear 63, which as will be observed from Figs. 1, 2 and 7, is secured to a transversely arranged shaft 64 provided with a rotating cutter 65, (see particularly Figs. 2 and 7), which cutter cuts the tube formed by the two layers of cords along the line of its inner periphery, into an open strip suitable for winding upon a tire forming core, this cutter being arranged at the bottom of the half circular substantially rigid arrangement of core sections, and at the point where the core sections change from the semi-circular formation into the linear formation, as they travel rearwardly along the lower leg of the endless chain.

The endless chain 10 of core sections can be driven in any suitable manner. I prefer, however, to utilize the inner series of rollers 14 for driving purposes. Consequently, I utilize the rollers 14 not only for cord compressing purposes, as will be referred to presently, but positively drive them so as to cause the said rollers to drive the chain of core sections. These rollers 14 are driven through the medium of a sprocket chain 66 which engages suitable sprocket wheels on the shaft 64 to which the cutter 65 is secured, and on the shafts or spindles to which the several rollers 14 are secured.

The inner drum is driven through gearing designated as a whole by the reference character 67 which gearing includes a gear on the long shaft 61 and the gear 26 secured to the rear end of the drum. In a similar manner, the outer drum is rotated by gearing designated as a whole by the reference character 68, this gearing including a gear on the shaft 61, and the gear 24 at the rear end of the outer drum. In order that the two drums may be driven in opposite directions simultaneously, the set of gears 68 includes in its train an idler gear (the details of which need not be here shown) which causes the gear 24 to be driven in the reverse direction with respect to the direction in which the gear 26 is driven. Thus it will be seen that with the above described mechanism, the chain of core sections is driven through the drums and through the winders: the core sections arrange themselves in the form of a half circle having considerable rigidity just beyond the winders: the cylinders carrying the spools which are rotated at the same angular speed but in reverse directions, as are likewise the winders which are connected to the cylinders: the cords are fed from the spools, pass through the rubber cement baths, are dried, and thence passed downwardly through openings in the annular winders which cause the cords to be wound in the two superimposed layers, the cords of one layer making a decided angle with the cords of the other layer. The cords of each layer adhere strongly to one another, and the two layers are also strongly adhesive. It will be understood that the length of tubular fabric formed in this manner at each revolution of the winders will depend upon the number of cords in each group, the rate of movement of the core being therefore dependent upon the number of threads in each group. I prefer to utilize at least forty cords in each group, although this number could be increased or decreased as found desirable.

For the purpose of uniting the layers of cord it is my purpose to introduce on top of the lower layer of cord, and beneath the upper layer of cord, a strip of unvulcanized or raw rubber, the same being wound spirally between the layers of cord. For this purpose, I provide a roll 75, having side flanges indicated at 76, this roller being of proper width to receive the roll of rubber which is to be wound upon the layer of cord. The roller is supported upon a suitable bracket, indicated at 77, and is mounted upon one of the brace rods which supports the winder 22. The arrangement is such that the roller may be adjusted so as to feed the rubber strip at the proper angle.

As is well known, the strip of raw rubber will be mounted upon a strip of muslin or similar material as is the usual practice with respect to uncured rubber in sheet form, and for the purpose of taking care of the strip of muslin, I have provided a receptacle or hopper 78 which is mounted upon an arm 79 that is carried by one of the supports for the winder 22. The hopper 78 is pivotally supported at the end of the arm 79, and by means of a spring 80, the receptacle is drawn toward the roller 75.

At the lower end of the hopper, the opening is closed by two wheels indicated at 81 and 82, the wheel 82 being provided with projections that are adapted to engage with the strip of cloth 83, upon which the unvulcanized rubber 84 is carried. The projections upon the wheel 82 will engage with the cloth and forcibly draw the cloth between the rollers 81 and 82, and so separate it from the rubber strip. The roller 81 is adjustably mounted in its bearing, and by means of a thumb screw 85, may be adjusted toward and from the wheel 82. The hopper is provided with a downwardly extending arm 86 which has a rounded portion at the bottom thereof. This arm serves to guide the strip of rubber and cloth from the roll 75, and is at the point of separation between the rubber strip and the cloth upon which it lies.

The wheel 82 engages with the cloth side of the roll of rubber strip carried upon roll 75. As the strip is rolled off of roll 75, the wheel 82 is turned, and so operates to feed the cloth strip into hopper 78.

As will be understood, the roller 75 is adjusted so that the strip of rubber material is fed onto the layer of cord which has been placed on the mandrel by the winder 21. As will be recalled, the threads which are supplied to the winder 21, are drawn through a receptacle 29, which contain a rubber cement solution, and likewise the cords which are fed to the winder 22 are impregnated with rubber cement solution. Therefore when the strip of uncured rubber is wound between the layers of cord, with the rubber cement thereon, the uncured rubber acts as a binder, completely and effectively joining the layers of cords together. This manner of securing intimately the layers of cords, is much more advantageous than merely depending upon cement, with which the cords are impregnated, or even supplying additional cement between the layers of cord, for the reason that the bond between the layers of cord is much stronger, and further for the reason that in vulcanizing there is less likely to be blow holes formed, because, as will be appreciated, the volatile material in the solid strip of rubber, is very small.

It will be understood that the roller 75 and the mechanism associated therewith, revolves inasmuch as it is mounted upon the frame which supports the winder 22. Therefore, the strip of rubber will be wound upon the mandrel in a spiral direction.

After the cords are laid onto the core in the manner above described in the two superimposed strongly adhering layers, the cords of the latter are compressed by the rollers 13 and 14, the rollers 14 driving the core sections, and also compressing the cords, and the roller 13 being driven by the traveling core sections and serving only to compress the cords. I prefer to use also in addition to the inner and outer sets of rollers 13 and 14, side rollers 70 in order that, as will be apparent from Fig. 6, all portions of the cords on the core will be compressed.

Preferably, as shown in Fig. 8, each of the rollers 13 and 70 is composed of a plurality of separately mounted sections which results in a much better compressing action at all points than would be the case if the roller were composed of a single rotating section, for with the construction shown, all parts of the roller have a true rolling action on the fabric surrounding the core, whereas otherwise there would be a certain degree of slippage between the fabric and certain portions of the roller, inasmuch as the rollers are concave, and the side portions are of greater diameter than the middle portions. As the tube thus formed on the core of the two superimposed layers passes from between the rollers, the tube is cut by the cutter 65, leaving the tube open at its inner periphery, as shown in Fig. 2. This open tube can then be wound upon a suitable reel until it is desired to apply the same to the core of a tire making machine.

It will be observed that I have made suitable provision for adjusting the tension of the chain of core sections by mounting the wheel 12 in a pivotally supported bracket 71, which can be rocked on its pivot by a suitable adjusting mechanism 72, the actuation of the latter serving to move the axis of the wheel 12 toward or away from the forward end of the apparatus.

One of the great advantages of a tire strip formed with my improved method lies in the fact that when it is applied to the core of a tire forming machine, it at once adjusts itself to the shape of the core, and when placed on the core, there is no material stretching of the fabric, as is the case when the tire is formed of regular woven strips, and with the strips formed with my method the outer parts are not placed under initial tension or stress, as is the case when the ordinary strips are stretched in applying them about the periphery of the core of a tire making machine.

Various modifications may be made in the device herein disclosed, without departing from the spirit of the invention. It will be obvious, however, that my invention in its broad aspects may be applied with equal facility for the manufacture of other devices such as hose, or other tubes. With such an apparatus, I have simply to wind the cords on a straight core or mandrel, as will be well understood without illustration.

Having thus described my invention, what I claim is:

1. An apparatus for making tire-forming strips, comprising a traveling core adapted at a certain point in its travel to assume a curved form, and means for winding tire-forming material spirally about the curved part of the core.

2. An apparatus for making tire-forming strips, comprising a traveling core adapted in a certain portion of its travel to assume a curved or arcuate shape, and means for winding tire-forming material spirally about the curved or arcuate part of the core.

3. In an apparatus of the character described, a traveling core adapted in a certain portion of its travel to assume a substantially rigid arcuate form, and means for winding in opposite directions tire-forming material spirally about the arcuate portion of the core.

4. In an apparatus of the character described, a traveling core adapted to assume in a portion of its travel a curved or arcuate shape, a rotating winder adapted to wind tire-forming material spirally about the curved or arcuate portion of the core so as to form curved tubular fabric, and means for splitting the tube so that the fabric may be removed from the core.

5. An apparatus for forming tubular fabric comprising a core, a winder adapted to wind a plurality of cords spirally about the core, means for moving the tubular fabric forward from the winder, a source of supply from which the cords extend to the winder, means for rotating the winder about the core, and means for winding upon the outside of the cords a strip of unvulcanized rubber.

6. In an apparatus of the character described, a core, having a curved or arcuate portion means for winding tire-forming material spirally about said portion of the core, and means for spirally winding upon the outside of the tire-forming material a strip of unvulcanized rubber.

7. An apparatus for forming tubular fabric comprising a core, means for winding independent groups of cords spirally about the core in opposite directions, and means for winding a strip of unvulcanized rubber between adjacent groups of cords.

8. An apparatus for forming tubular fabric comprising a traveling core, means for winding a plurality of cords spirally about the core, a source of supply from which the cords extend to said winding means, and means for winding a strip of unvulcanized rubber upon the exterior of said cords.

9. An apparatus for forming tubular fabric comprising a traveling core, means for winding independent groups of cords spirally about the core in opposite directions, means for supplying cords to said winding means, and means for winding between adjacent groups of cords a strip of unvulcanized rubber.

10. An apparatus for forming tubular fabric comprising a traveling core, a pair of winders for winding independent groups of cords spirally about the core, means for rotating the winders in opposite directions, means for supplying cords to each of said winders, and means for winding a strip of unvulcanized rubber between the adjacent layers of cords.

11. An apparatus for forming tubular fabric comprising a core, means for winding a plurality of cords spirally about the core, means for moving the said tubular fabric forward with respect to the winding means, a source of supply from which the cords extend to the winding means, means for impregnating the said cords with rubber cement, and means for winding a strip of unvulcanized rubber upon the exterior of the said cords.

12. An apparatus for forming tubular fabric comprising a core, means for winding independent groups of cords spirally about the core in opposite directions, means for moving the said tubular fabric forward with respect to the winding means, a source of supply from which the cords extend to the winding means, means for impregnating the said cords with rubber cement, and means for winding between the layers of cords a strip of unvulcanized rubber.

13. An apparatus for forming tubular fabric comprising a traveling core, means for winding a plurality of cords spirally about the core, and means adapted to receive a portion of the traveling core at the point where the winding means operates thereon and cause a portion of the core to assume a substantially rigid and semi-circular form.

14. An apparatus for forming tubular fabric comprising a traveling core, means for winding a plurality of cords spirally about the core, means adapted to receive a portion of the core which is adjacent the winding means and cause a portion of said core to assume a substantially rigid and semi-circular form, and means for splitting the tube.

15. An apparatus for forming tubular fabric comprising a segmented traveling core, means for winding a plurality of cords spirally about the core, and a frame adjacent the winding means adapted to receive a portion of said core and cause the same to assume a substantially rigid and semi-circular form, said frame being provided with rollers adapted to compress the cords wound upon the core.

16. An apparatus for forming tubular fabric comprising a traveling core, means for winding a plurality of cords spirally about the core, and means adjacent the winding means for causing a portion of the core to assume a substantially rigid and semi-circular form and comprising means engaging the outside of the formed cords to compress the same.

17. An apparatus for forming tubular fabric comprising a traveling core, means for winding a plurality of cords spirally about the core, means adjacent the winding means for causing a portion of the core to assume a substantially rigid and semi-circular form and comprising means engaging the outside of the formed cords to compress the same, and means for splitting the tube.

18. Apparatus for forming tubular fabric comprising a traveling core, means for winding independent groups of cords spirally about the core in opposite directions, means for supplying a strip of unvulcanized rubber between the adjacent layers of cords, and means engaging a portion of the core adjacent the winding means and causing said core to assume a substantially rigid and semi-circular form.

19. Apparatus for forming tubular fabric comprising a traveling core, means for winding independent groups of cords spirally about the core in opposite directions, means for supplying a strip of unvulcanized rubber between the adjacent layers of cords, means engaging a portion of the core adjacent the winding means and causing said core to assume a substantially rigid and semi-circular form, and means for splitting the tube.

20. In an apparatus of the character described, a core, having a curved or arcuate portion means for forming separate layers on the core by winding tire-forming material about said portion of the core in opposite directions, and means for spirally winding a strip of unvulcanized rubber between adjacent layers.

21. In an apparatus of the character described, a traveling core adapted to assume in a portion of its travel a curved or arcuate shape, means for winding tire-forming material about the curved or arcuate portion of the core, and means for winding upon the outside of the tire-forming material a strip of unvulcanized rubber.

22. In an apparatus of the character described, a traveling core adapted to assume in a portion of its travel a curved or arcuate shape, means for winding in opposite directions independent layers of tire-forming material spirally about the curved or arcuate portion of the core, and means for winding a strip of unvulcanized rubber between the two layers.

23. In an apparatus of the character described, a segmented traveling core, means for causing a portion of the core to assume an arcuate shape, and means for winding tire-forming material spirally about said portion of the core.

24. In an apparatus of the character described, a segmented traveling core, means for causing a portion of the core to assume an arcuate shape, and means for winding tire-forming material spirally in opposite directions about said arcuate shaped portion of the core.

25. In an apparatus of the character described, a traveling core composed of connected sections, means for causing a portion of the core to assume an arcuate shape, means for winding tire-forming material spirally about the arcuate shaped portion of the core so as to form curved tubular fabric and means arranged to engage the outside of the tubular fabric to compress the same.

26. An apparatus for making tire strips, comprising a traveling core made up of connected segments, means for causing a portion of the core to assume an arcuate shape, means for winding tire-forming material about the arcuate shaped portion of the core so as to form a curved tubular fabric, and means for splitting the tube.

27. In an apparatus of the character described, an endless flexible traveling core comprising a plurality of connected segments or sections, and means for winding tire-forming material about a portion of said core.

28. In an apparatus of the character described, a flexible traveling core formed of a series of pivotally connected segments or sections, means for causing a portion of said core to assume a curved or arcuate shape, and means for winding tire-forming material about said curved or arcuate portion of the core.

29. In an apparatus of the character described, a flexible core composed of a series of connected wedge-shaped sections, means for causing a portion of said core to assume a curved or arcuate form, and means for winding tire-forming material about said curved or arcuate portion of the core.

30. An endless flexible core for a fabric making machine, comprising a series of connected segments.

31. An endless flexible core for a fabric making machine, comprising a series of pivotally connected segments.

32. An endless flexible core for a fabric making machine, comprising a series of connected sections whose end faces are convergent, whereby a plurality of adjacent sections may assume a substantially semi-circular shape.

33. A flexible core for a fabric making machine, comprising an endless series of relatively movable connected sections.

34. In an apparatus of the character described, a flexible traveling core comprising an endless series of connected segments or sections, and means for causing a portion of said segments or sections to assume an arcuate or curved form.

35. In an apparatus of the character described, a flexible traveling core comprising an endless series of connected segments or sections, and core supporting means for causing the segments to assume a substantially semi-circular arrangement during a certain portion of the travel of the segments.

36. In an apparatus of the character described, a core having a substantially straight portion and a curved or arcuate portion, a winder adapted to wind tire-forming material about said last named portion, and a member rotatable about the straight portion of the core and carrying a supply of tire-forming material which is fed to said winder.

37. In an apparatus of the character described, a core having a straight portion and a curved or arcuate shaped portion, a pair of winders rotatable in opposite directions for winding tire-forming material spirally in opposite directions about the curved or arcuate portion of the core, and a pair of members both rotatable in opposite directions about the straight portion of the core and each carrying a supply of tire-forming material which is fed to one of the winders.

38. In an apparatus of the character described, a core having a straight portion and a curved or arcuate portion, a winder for spirally winding tire-forming material about the curved or arcuate portion of the core member rotatable about the straight portion of the core, in unison with said winder and carrying a supply of tire-forming fabric which is fed to said winder, and a chamber containing cementitious material through which said tire-forming material passes before reaching the winder.

39. In an apparatus of the character described, a core having a curved or arcuate portion and having a substantially straight portion, a pair of winders rotatable in opposite directions for winding tire-forming material spirally about the curved or arcuate portion of the core, a pair of concentric members rotatable in opposite directions about the straight portion of the core and each carrying a source of supply of tire forming material which is fed to one of the winders.

40. In an apparatus of the character described, a traveling core having a substantially straight portion and having a curved or arcuate portion, and a member rotatable about the straight portion of the core, said member carrying a source of supply of tire-forming material and carrying a rotatable winder, said winder being arranged to wind tire-forming material about the curved or arcuate portion of the core.

41. In an apparatus of the character described, a traveling core having a substantially straight portion and a curved or arcuate portion, a member rotatable about the straight portion of the core, and carrying a source of supply of tire-forming material, and a chamber containing cementitious material, through which said tire-forming material passes, and a rotatable winder movable with said member, said winder being arranged to wind the tire-forming material spirally about the curved or arcuate portion of the core.

42. In an apparatus of the character described, a traveling core having a substantially straight portion and a curved or arcuate portion, a pair of members rotatable about the straight portion of the core and each carrying a source of supply of tire-forming material, a pair of rotary winders supported from the ends of the two members and adapted to wind tire-forming material about the curved or arcuate portion of the core, and means for rotating said members in opposite directions.

43. In an apparatus of the character described, a flexible endless core composed of sections or segments connected together and having a straight portion and a curved or arcuate portion, a pair of cylinders rotatable about the straight portion of the core and each carrying a supply of tire-forming material, a pair of rotary winders adjacent the curved or arcuate portion of the core and adapted to wind tire-forming material received from said cylinders about the curved or arcuate portion of the core, and means for simultaneously rotating said cylinders and said winders in opposite directions.

In testimony whereof, I hereunto affix my signature in the presence of two witnesses.

JOHN T. LISTER.

Witnesses:
 A. F. KWIS,
 L. I. PORTER.